US010839646B2

(12) United States Patent
Jones

(10) Patent No.: US 10,839,646 B2
(45) Date of Patent: *Nov. 17, 2020

(54) GEOGRAPHICAL PRIZE CODING SYSTEM FOR LOTTERY DRAW GAMES

(71) Applicant: Christopher M. Jones, Woodland, CA (US)

(72) Inventor: Christopher M. Jones, Woodland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/597,815

(22) Filed: Oct. 9, 2019

(65) Prior Publication Data
US 2020/0051382 A1 Feb. 13, 2020

Related U.S. Application Data

(63) Continuation-in-part of application No. 16/035,902, filed on Jul. 16, 2018, now Pat. No. 10,445,981, which is a continuation-in-part of application No. 15/488,481, filed on Apr. 16, 2017, now abandoned.

(51) Int. Cl.
G07F 17/32 (2006.01)
G06F 21/60 (2013.01)
G07F 17/42 (2006.01)

(52) U.S. Cl.
CPC ........ G07F 17/3244 (2013.01); G06F 21/602 (2013.01); G07F 17/329 (2013.01); G07F 17/3223 (2013.01); G07F 17/3241 (2013.01); G07F 17/42 (2013.01)

(58) Field of Classification Search
CPC .................................................... G07F 17/32
See application file for complete search history.

(56) References Cited

U.S. PATENT DOCUMENTS

| 4,033,588 | A | 7/1977 | Watts |
| 4,277,064 | A | 7/1981 | Newman |
| 4,323,770 | A | 4/1982 | Dieulot et al. |
| 4,494,197 | A | 1/1985 | Troy et al. |
| 4,689,742 | A | 8/1987 | Troy et al. |
| 5,118,110 | A | 6/1992 | Jones |
| 5,380,007 | A | 1/1995 | Travis et al. |
| 5,511,784 | A | 4/1996 | Furry et al. |
| 5,791,991 | A | 8/1998 | Small |
| 6,016,338 | A | 1/2000 | Bansai |
| 6,168,521 | B1 | 1/2001 | Luciano et al. |
| 6,371,482 | B1 | 4/2002 | Hall, Jr. |
| 6,802,506 | B2 | 10/2004 | Spende |
| 7,662,038 | B2 | 2/2010 | Bozeman |
| 8,727,853 | B2 | 5/2014 | Kratz et al. |
| 9,286,747 | B2 | 3/2016 | Chang |
| 9,561,428 | B2 | 2/2017 | Antonopoulos |
| 9,613,492 | B2 | 4/2017 | Englman |
| 2003/0027621 | A1 | 2/2003 | Libby |
| 2003/0047869 | A1 | 3/2003 | Walker et al. |
| 2003/0090058 | A1 | 5/2003 | Bress |
| 2003/0130950 | A1 | 7/2003 | Ahles |
| 2004/0173965 | A1 | 9/2004 | Stanek |

(Continued)

Primary Examiner — Omkar A Deodhar
(74) Attorney, Agent, or Firm — Richard A. Baker, Jr.

(57) ABSTRACT

A geographically based lottery game is described where prizes are allocated based on the geographic location or residence of the lottery player. The lottery terminal determines the player's residence and sets parameters for the lottery ticket, such as the count of symbols to be picked and the range of the symbols. Prizes are then awarded within the geographic area.

20 Claims, 6 Drawing Sheets

(56) References Cited

U.S. PATENT DOCUMENTS

| | | |
|---|---|---|
| 2004/0204224 A1 | 10/2004 | Finnochio |
| 2005/0027623 A1 | 2/2005 | Otero |
| 2005/0064930 A1 | 3/2005 | Jubinville |
| 2005/0261054 A1 | 11/2005 | Bress |
| 2009/0131139 A1 | 5/2009 | Frick et al. |
| 2009/0298566 A1 | 12/2009 | Frick |
| 2009/0318213 A1 | 12/2009 | Wright |
| 2010/0261516 A1 | 10/2010 | Packs, Jr. et al. |
| 2013/0116025 A1 | 5/2013 | Chamberlain |
| 2013/0200606 A1 | 8/2013 | Omar |
| 2014/0194177 A1 | 7/2014 | Moskowitz |
| 2015/0080082 A1 | 3/2015 | Moskowitz |
| 2015/0087374 A1 | 3/2015 | Moskowitz |
| 2015/0339878 A1 | 11/2015 | Moskowitz |
| 2016/0354684 A1 | 12/2016 | Murray |
| 2016/0379443 A1 | 12/2016 | Abbott |
| 2017/0032622 A1 | 2/2017 | Moskowitz |

GEOGRAPHICAL PRIZE CODING SYSTEM FOR LOTTERY DRAW GAMES

CROSS REFERENCE TO RELATED APPLICATIONS

This application is a continuation-in-part application, for which priority is claimed under 35 U.S.C. § 119, of co-pending U.S. patent application Ser. No. 16/035,902, filed Jul. 16, 2018, and entitled "A Geographical Prize Coding System for Lottery Draw Games,". Application Ser. No. 16/035,902 is a continuation-in-part of U.S. patent application Ser. No. 15/488,481, filed Apr. 16, 2017, and entitled "A Geographical Prize Coding System for Lottery Draw Games," the entire content of both of the above patent applications are incorporated herein by reference.

BACKGROUND

Technical Field

The system, apparatuses and methods described herein generally relate to a game of chance, and more particularly, to a lottery game based on geographical coding.

Description of the Related Art

A typical conventional lottery game in the United States involves a plurality of parameters and a plurality of variables within the parameters. Generally, the variables range from zero or one to X. The odds of winning the top prize can be altered by increasing the parameters and making X a larger or smaller number. The "pick 3" and "pick 4" are examples of lottery number games. Three or four digits are chosen, and the lottery system picks the winners. If the player's numbers match the lottery's numbers in exact order, a top prize is awarded. Other features include a system where a player can match the two front digits, the two back digits, the first and last digit, or some combination of the above. Other lottery games include the "mega millions" and "Powerball" where six numbers are drawn and if a player matches all numbers there is a grand prize with subordinate payouts for the matching part of the numbers.

Several types of conventional lottery systems have been proposed. Such conventional lottery systems include, but are not limited to: (i) automated lottery systems; (ii) video lottery systems; (iii) lottery systems with pluralities of parameters and variables; (iv) lottery systems having two pools of numbers; (v) lottery systems where a player inputs a specific date and a lottery number is chosen for the player to play; (vi) and lottery systems where numerical date-time and astrological fields serve as an inspiration to the player as to which numerical selections to make. Below, some examples of conventional art related to the aforementioned lottery systems is described.

The following U.S. patents describe various conventional automated lottery systems: U.S. Pat. No. 4,033,588 to Watts; U.S. Pat. No. 4,277,064 to Newman; U.S. Pat. No. 4,323,770 to Dieulot, Juan, and Fardeau; U.S. Pat. No. 4,494,197 to Troy and Mullenix; U.S. Pat. No. 4,689,742 to Troy and Mullenix. U.S. Pat. No. 7,662,038 to Bozeman describes a lottery game with a plurality of parameters and variables. The following two U.S. patents describe video lottery systems: U.S. Pat. No. 5,380,007 to Travis and Travis; U.S. Pat. No. 6,168,521 to Luciano, Bunce, Feldman, Forman, and Levine. U.S. Pat. No. 5,511,784 to Furry and Tode describes one of the many means the lottery game systems select winners. U.S. application Pub. No. US 2004/0173965 to Stanek describes a lottery having two pools of numbers. U.S. Pat. No. 5,118,110 to Jones describes a lottery number selector where a player inputs a specific date and a lottery number is chosen for the player to play. U.S. Pat. No. 6,802,506 to Spende is a calendar based game, similar to U.S. Pat. No. 5,118,110 to Jones, where a player can choose an entry number based on a specific point of time however the chosen numbers generally are not in correspondence to a specific moment time. U.S. Pat. No. 6,802,506 to Spende features numerical date-time and astrological fields where date, numerology, and astrology related events provide the inspiration to the player as to which numerical selections to make. However, the player does not choose dates, but numbers that he may connect with dates. The numerical date-time and astrological fields serve only as an inspiration to the player.

Socially, the only time people in smaller areas come out to play the lottery is when the prize pool exceeds a certain amount. Higher income people gamble more, but they do not play the lottery as much as middle and lower class people do. Higher income people are more likely to gamble in a casino with larger sums of money. You can't go to a casino with just one dollar in hopes of winning. But people with a spare dollar are more likely to gamble on the lottery. Socially, it is the middle and lower class who contribute a large amount to lottery sales. There is a need in the market to drive lower, middle and upper class people to the same lottery game. The present application discusses an approach to localize and guarantee local winnings in a lottery game.

However, lottery players often feel disenfranchised when the winners of the lottery are in a distant location. When winners are announced locally, lottery players will often flock to the store that sold the lottery ticket in hopes that fortune will strike twice. However, no current lottery game address the locality of the game. There is a need in the market to address the geographical locality of prize distribution. This invention describes a solution to the shortcoming of the art.

SUMMARY OF THE INVENTION

A lottery terminal made up of a special purpose processor equip to run encryption algorithms, a communications system electronically connected to the special purpose processor and to a network, a printer electrically connected to the special purpose processor equip to print or display a lottery ticket, and a reader electronically connected to the special purpose processor is described. The special purpose processor executes codes to determine a geographic area of a user from a plurality of geographic areas, then uses the geographic area to determine a count of symbols for the user to select based upon the geographic area, receives from the user a selected set of symbols, and then directs the printer to print the symbols on the lottery ticket or the screen to display the lottery ticket.

The symbols could be numbers in some embodiments. The geographic area could be selected by the user. Or the reader on the lottery terminal could read user information from a user identification card and the special purpose processor could use the user information to determine the geographical area. The count of symbols could be based on a population of the geographic area. Each geographic area could have unique odds of winning and unique prizes, and the prizes could be drinks.

A method for playing a lottery game is also described, where the method comprises the steps of first receiving an indication from a user of an intent to purchase a lottery ticket on a lottery terminal; then determining, by the lottery terminal, a geographic location associated with the user from a plurality of geographic locations; followed by determining, based on the geographic location, a count of symbols for the user to select; and determining a set of symbols associated with the lottery ticket; next encrypting, using the special purpose processor, the symbols and the geographic location into a first data packet; followed by transmitting the first data packet over the network for validation, using the communications subsystem; next, receiving from the network a second data packet using the communications subsystem; decrypting the second data packet with the special purpose processor; and printing or displaying the lottery ticket using data from the second data packet. The lottery terminal is made up of a special purpose processor equip to execute encryption algorithms, a printer electrically connected to the special purpose processor, and a communications subsystem electrically connected between the special purpose processor and a network.

The symbols used in the method could be numbers in some embodiments. The geographic area could be selected by the user. Or the reader on the lottery terminal could read user information from a user identification card and the special purpose processor could use the user information to determine the geographical area. The count of symbols could be based on a population of the geographic area. Each geographic area could have unique odds of winning and unique prizes, and the prizes could be food.

Another aspect of the inventions described herein is a lottery system made up of a network and a lottery server connected to the network, where the lottery server is connected to a plurality of lottery terminals through the network. Each of the lottery terminals are made of a special purpose processor equip to run encryption algorithms; a communications system electronically connected to the special purpose processor and to the lottery server through the network; a printer electrically connected to the special purpose processor equip to print a lottery ticket or a screen to display a lottery ticket; and a reader electronically connected to the special purpose processor. Each special purpose processor executes codes to determine a geographic area of a user from a plurality of geographic areas, uses the geographic area to determine a count of symbols for the user to select based upon the geographic area, receives from the user a selected set of symbols, and print or display the symbols on the lottery ticket.

In the lottery system, the symbols could be numbers and the geographic area could be selected by the user. The reader on the lottery terminal could read user information from a user identification card and the processor could use the user information to determine the geographic area. Each geographic area could have unique odds of winning and unique prizes.

DETAILED DESCRIPTION OF THE INVENTION

As explained above, there is a need for a lottery game that directs prizes to pre-specified geographic locations to encourage lottery players to acquire more tickets at their local stores. As such, a lottery game that codes prizes to specific geographic areas is described. The prizes could include a wide set of possible prizes, including stuffed animals, points, candy, drinks, food, as well as cash.

Figure 1:
FIG. 1 is a maps of the counties of California as an example of geographic regions.

For example, FIG. 1 is a map of the counties in the State of California 101. Kern County 102 is marked, as is Los Angeles County 102 and Alpine County 104. In order to encourage the use of the lottery in Kern County 102, a general California 101 statewide lottery game has an additional field in the ticket designation that specifies a county. Based on county population or upon the average number of tickets sold in that county, one or more prizes are allocated to that county, and a winning number is assigned to that particular county. This assures a set prize distribution to a specific geographic area, in this case a county.

While this embodiment uses counties, other embodiments could use one or a set of Zip Codes, Area Codes, City Codes, FIPS Codes, MAF/TIGER Feature Class Codes, County Codes, Country Codes, State Codes, District Codes, U.S Codes, Geographical Codes, GPS coordinates (either defining an area boundaries or the GPS coordinate of the center of a circle plus a radius of the circle) or any other codes that identify people places and objects.

The location used could be the location where the lottery ticket is acquired or it could be an address from an identification card. For instance, a driver's license could be used to determine the lottery player's home address. In this case, the address on the driver's license would determine which geographic location that the lottery ticket would be allocated to. In some embodiments, the lottery player is prohibited from playing the game without valid identification. The lottery player could use any lottery terminal in the system and still be allocated to his home county.

In other embodiments, the players (or winners) could be chosen from a select group of people, for instance one or a plurality of minority groups. One day the game could be sold only to one minority and another day to a second people group. In some embodiments, those people could have to live in a specific geographical area. In one embodiment, a person has to have green eyes and lives in Massachusetts in order to play the game. In another embodiment, sexual orientation could be used to determine whether to play the game: if a person is single, married, gay, straight in a certain geographic area is required to play or win. Ages could also be used.

In another embodiment, the winners could also be chosen by an organization in a geographic area, for instance a church, or auto shop. Or the players could be limited to an organization in a geographic area.

In still another embodiment, winners could also be chosen by opinions in a specific geographic areas. If someone comes up with their thoughts and/or opinions within a certain area they are eligible to play the game or win that prize.

In another embodiment, the players (or winners) could also be chosen by the certain weather within a geographic area. For instance, if it snows in Detroit then that's where the winner will be chosen from or the location where the tickets are sold.

Winners or players could be chosen from a language group within a geographical area. If a person speaks Swedish and lives in Massachusetts, then the person could become a player for that week's drawing. Winners could also be chosen by occupation in a geographic area or by education in a geographic area.

In the preferred embodiment, the lottery game is a weekly game. A player must purchase a ticket a local lottery dealer within a specified time. There will be a specified day, time and hour deadline that a player can participate in the game. There will be a minimum and max number of tickets a player can purchase. If a player doesn't make the purchase a ticket and does not make the deadline that ticket will be forwarded to the next weeks draw. The draw will take place immediately after the deadline. Once the lottery system has had time to calculate and administer the tickets to the appropriate geographical area (FIPS Code) pools the prize allocation will be begin.

Figure 2:
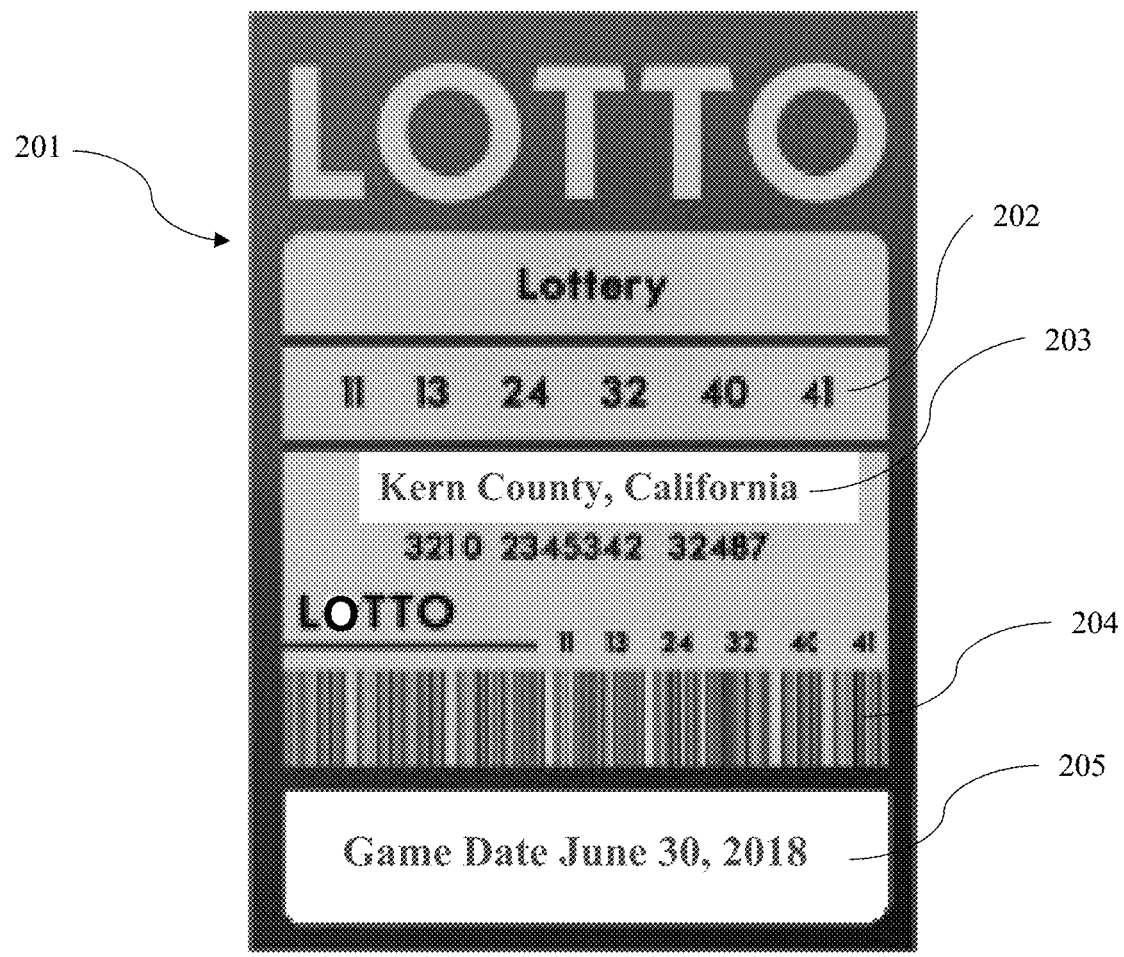
FIG. 2 is an example of a lottery ticket.

FIG. 2 shows a sample lottery ticket 201. The ticket has the selected symbols 202. The count of symbols used could be varied based on the population of the geographic region. For instance, Kern County 102 is about 850,000 people, and so a five symbols selection may be appropriate. Los Angeles County 103 has about 10 million people, so six symbols may appear on the ticket for that county. Alpine County 104 only has a population of 1100, and may only be allocated three symbols (or may be combined with nearby counties). The symbols could be a digit, a number (multiple digits), letters, combinations of letters, icons, other alphabets, or similar.

The lottery ticket 201 includes the geographic location designation 203, in this case Kern County, Calif. 202. In some embodiments, a picture of the geographic location or a distinguishing landmark is included on the lottery ticket.

In addition, the lottery ticket 201 may contain the date of the lottery drawing 205.

In addition, the lottery ticket 201 may include a machine readable code 204 such as a bar code, a QR code, a magnetic strip, a numeric code, or similar to allow for the ticked to be read by a machine. This machine readable code 204 may include the date of the drawing, the selected numbers, the specified geographic locations, an indication of the identity of the purchaser (a picture of the ID, the driver's license number, a full address, or similar), and a verification code from the central lottery computer that identifies the transaction. In another embodiment, the machine readable code 204 is a link to a record on the central lottery computer that contains the date of the drawing, the selected numbers, the specified geographic locations, an indication of the identity of the purchaser. It could also include a verification code, a checksum, or other data integrity method. Or the machine readable code 204 could be any combination of this information.

Figure 3:
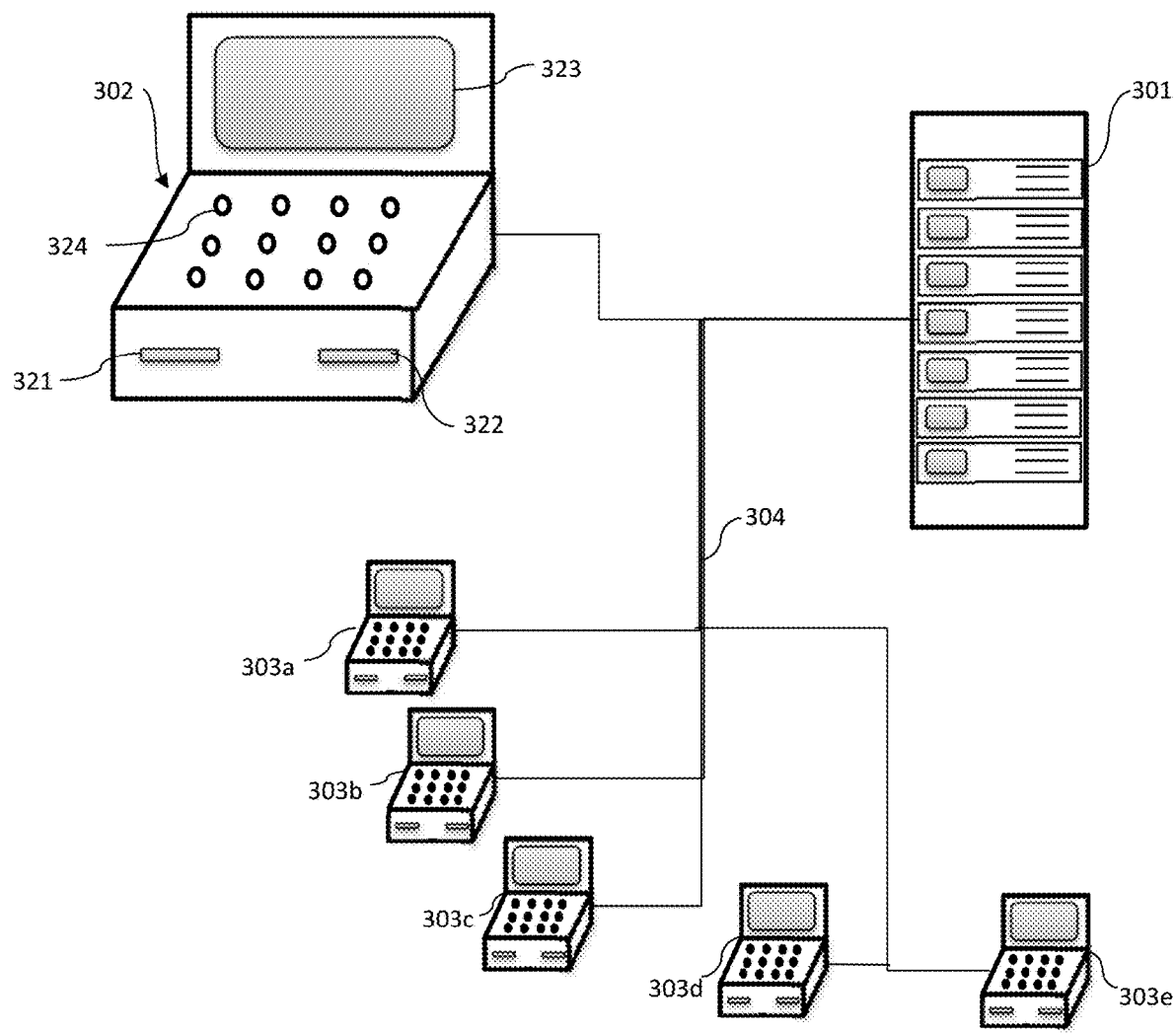
FIG. 3 is a diagram of a possible computer network for implementing this invention.

FIG. 3 shows a possible special purpose networked computing system designed to implement this lottery invention. A server 301 is a secure central computing facility to handle all of the processing of lottery tickets. It is accessed through a secure network 304 to prevent manipulation of the lottery by unauthorized personnel. The network 304 could be the internet or other wide area network, and preferably runs a secure access protocol like Virtual Private Network (VPN), Secure Sockets Layer (SSL) or Transport Layer Security (TSL). Alternatively, the network 304 could be a phone dialup network, or direct lines to the server 301. Typically, all messages are encrypted.

Special purpose lottery terminals 302, 303a-e are connected to the server 301 through the network 304. Terminals 302, 303a-e could be located anywhere, but in the preferred embodiment at least one terminal is located in each geographic area.

Special purpose lottery terminal 302 is an example of the other terminals 303a-e. This terminal 302 has a display screen 323 for showing the operator the data that is entered and for displaying an image of the lottery ticket. The terminal 302 also has a keyboard 324 for entering data into the terminal. In addition, the terminal 302 has a printer 321 for printing out lottery tickets 201. A reader 322 for reading identification cards and credit cards is also incorporated in the terminal 302. The terminal 302 has an interface to the network 304. The terminal 302 has a special purpose processor connecting the display screen, the keyboard, the printer, the reader and the network interface. The special purpose processor must be able to process encryption and decryption algorithms. In some embodiments, this may mean that the special purpose processor has floating point processing capabilities.

In some embodiments, the special purpose lottery terminal 302 could be replaced by another computing device such as a home computer, laptop computer, smart watch, smart phone, smart TV, tablet, Apple box, notebook computer, car dashboard electronic systems, video game controllers, ipods interactive exercise equipment, Microsoft Surface or similar device. A player may buy a ticket using the another computing device and get confirmation of their numbers and print out a ticket if desired on a home computer printer or any wireless printer. In this embodiment, the another computing device transmits its location to the server 301 through the network 304, and the server 301 sends a request to the another computing device for the user to enter the number of selected game numbers. These selected game numbers are then sent to the server 301 to record the bet. People can also use their computers to make calls to the server 301 rather than using the network 304.

In another embodiment, a telephone could be used to call the server 301 and automatically input the selected numbers through voice recognition (or by typing in the numbers on the phone keypad). The phone number could be used to determine the location of the user, either through a GPS chip or through the phone number location. The ticket could be emailed or texted to the phone.

In another embodiment, a lottery ticket vending machine could vend scratch tickets where the count of the selected numbers on the ticket is based on the location of the machine.

Figure 4:
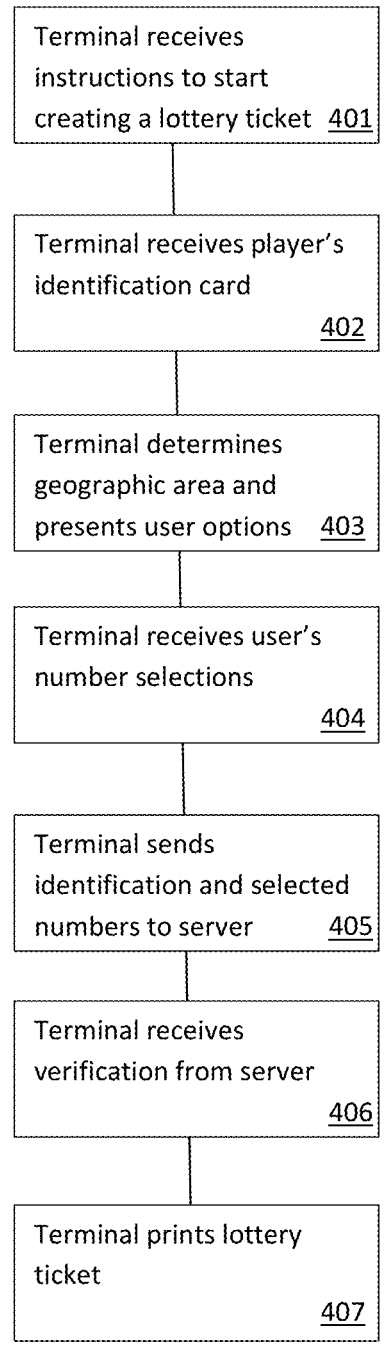
FIG. 4 is a flow chart of one embodiment of the process for handling the lottery game described herein.

FIG. 4 shows the operation of the special purpose lottery terminal 302. A lottery player approaches the terminal to start the process of acquiring a lottery ticket and the terminal initiates the lottery ticket process 401. Alternatively, a clerk could operate the terminal for the player.

Once the process is started, the terminal requests an identification card from the lottery payer 402. The player inputs the identification in the reader 322. The reader scans the identification card or reads information off of the card. The card could be a passport, a driver's license or a credit card. If a credit card, the terminal may request a zip code, or it may connect to a server to retrieve a zip code. From the identification, the lottery terminal 302 determines the lottery player's a geographic location 403. In other embodiments, the player types in his location, or a GPS (or similar) function on the terminal indicates the geographic location.

Once the location is determined, the parameters of the lottery game are determined. For instance, based on the size of the county in which the lottery user resides, the count of the symbols that the player selects and perhaps even the range of the symbols is determined. A large county such as California's Los Angeles County 103 may require six numeric symbols with a range of one to fifty for each number. Whereas a small county, such as Alpine County 104 may require four numeric symbols with a range of one through fifteen. In another embodiment, the numeric symbols have a range of one to ten and the count of numbers range from four to eight.

Next, the terminal 302 receives the player's selection 404 either through the keyboard 324 or through the reader 322. The terminal 302 sends the player's selection, the geographic area and identification through the network 304 to the server 301.

The server 301 validates the information that is received from the terminal. In one embodiment, the number of tickets from a player is limited, and the server verifies that the player has not purchased more tickets than allowed. The server 301 may also verify that each number is within the range and that the correct count of numbers has been selected. The player's identification may also be verified.

The server 301 stores the player's selection, the geographic area, and the identification in the server's memory and creates a validation code. The validation code is sent back to the terminal 302.

The terminal 302 then prints the lottery ticket 201 using the printer 321 on the terminal or displays an image of the lottery ticket on the screen.

When the date for the lottery drawing arrives, a set of symbols is selected for each geographic area are selected. In one embodiment, the lottery players that selected the symbols are notified using the identification information. In other cases, the players need to compare their ticket 201 to the one chosen for that geographic area. If there is a match, a prize is awarded. In some cases multiple prizes are awarded.

In one embodiment, the game is implemented in two parts; part one is the setup and the game itself, and part two is the ticket purchase.

Setup

Figure 5:
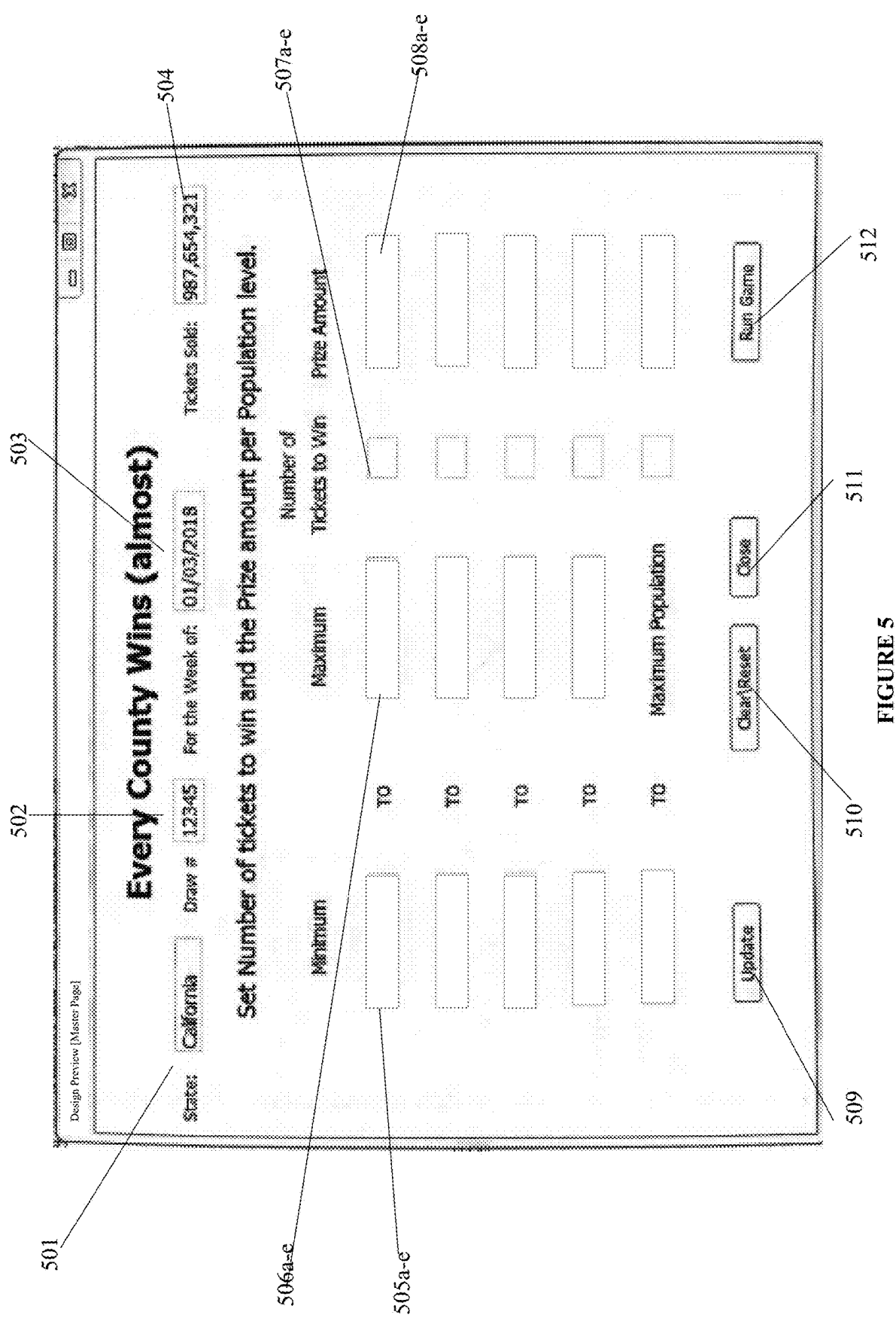
FIG. 5 is a sample screen shot of the game setup.
Figure 6:
FIG. 6 is a sample screen shot of the purchase of a ticket.

The setup screen, as seen in FIG. 5, allows for the game administrator to set the number of tickets and the prize for population levels. The logic is that a county must be able to support the prize amount and number of prizes for that population level. A minimum population can be set so that a county with a very small or zero population cannot participate. Larger populations will have the ability to have larger prizes and/or more prizes available.

When the Master Control page is opened, the state name 501 will be displayed at the top, along with the Draw number 502, and the week of the drawing 503. The number of tickets sold 504 in the previous game is also displayed. The program will look for the Master Page file to fill in the information from the last game setup. If the file is not found, the fields will be blank except for a 1 in the first box, which is the default. Add or change the population levels 505a-e, 506a-e, number of prizes per level 507a-e, and the prize amount for that level 508a-e. The last line 506e will have a minimum population but no entry for a maximum population level, since in theory, there can be no maximum population and the program will accept any population size equal to or larger than the minimum population for that level.

Your options are to update the Master File 509, Clear\Reset the fields in the window 510, Close the window without making any changes to the Master File 511, or to Run the Game 512, which would save the fields into the Master File, then run the game by picking the tickets.

Game Run

In one embodiment, the game is run by processing all the tickets purchased in the last Draw. The program will read the County File in alphabetical order. Read through the ticket file and load the ticket array with the tickets purchased in that county. Match the population for that county to the population level in the Master File to determine the number of winning tickets and the prize for that ticket. Match the winning tickets to the Vendor File and save the line. Return to select the next county. At the end of the county file run, print out the list of winning tickets for each county.

Ticket Purchase

In one embodiment, shown in FIG. 5, the game process allows the buyer to purchase one to 5 tickets. The first ticket must be from the buyer's home county. The remaining tickets can be purchased from any other county 602, 603. The vendor will have the home county already selected 601. As each county is selected in the listing, the fields below the box will display the population 604, the number of tickets 605 and the prize amount 606 as each county. The buyer may buy one to five tickets, as long as the first ticket is his home county. Once selected the buyer hits the Submit button 607.

A ticket will print out for each county, which will include the date of the sale, the vendor number, the county name, the date of the next ticket draw, and a small graphic outline of the county, plus a security bar code.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A lottery terminal comprising:
   a special purpose processor equip to run encryption algorithms;
   a communications system electronically connected to the special purpose processor and to a network;
   a display screen electronically connected to the special purpose processor equipped to display a lottery ticket;
   wherein the special purpose processor executes codes to determine a geographic area of a user from a plurality of geographic areas, uses the geographic area to determine a count of symbols for the user to select when playing a lottery game based upon the geographic area, receives from the user a selected set of symbols, and directs the display screen to display the symbols on the lottery ticket,
   wherein the count of symbols is based on a population of the geographic area.

2. The lottery terminal of claim 1 wherein the symbols are numbers.

3. The lottery terminal of claim 1 wherein the geographic area is selected by the user.

4. The lottery terminal of claim 1 wherein the lottery terminal further comprises a GPS chip electrically connected to the special purpose processor, said GPS chip determining the geographical area.

5. The lottery terminal of claim 1 wherein each geographic area has unique odds of winning and unique prizes.

6. The lottery terminal of claim 5 wherein the prizes are drinks.

7. The lottery terminal of claim 1 wherein the lottery terminal is a laptop computer.

8. A method for playing a lottery game, comprising:
   receiving on a lottery terminal, an indication from a user of an intent to purchase a lottery ticket, wherein the lottery terminal comprises a special purpose processor equipped to execute encryption algorithms, a display screen electrically connected to the special purpose processor, and a communications subsystem electrically connected between the special purpose processor and a network;

determining, by the lottery terminal, a geographic location associated with the user from a plurality of geographic locations;

determining, based on the geographic location, a count of symbols for the user to select, wherein the count of symbols is based on a population of the geographic location;

determining a set of symbols associated with the lottery ticket;

encrypting, using the special purpose processor, the symbols and the geographic location into a first data packet;

transmitting the first data packet over the network for validation, using the communications subsystem;

receiving from the network a second data packet using the communications subsystem;

decrypting the second data packet with the special purpose processor;

displaying the lottery ticket using data from the second data packet on the display screen.

9. The method of claim 8 wherein the set of symbols are determined by user selection.

10. The method of claim 8 wherein the symbols are numbers.

11. The method of claim 8 wherein the lottery terminal determines the geographic location based on a selection by the user.

12. The method of claim 8 wherein the lottery terminal determines the geographic location based on a reading of a GPS chip electrically connected to the special purpose processor.

13. The method of claim 8 wherein each geographic area has unique odds of winning and unique prizes.

14. The method of claim 13 wherein the prizes are food.

15. The method of claim 8 wherein the lottery terminal is a smart phone.

16. A lottery system comprising
a network;
a lottery server connected to the network, the lottery server connected to a plurality of lottery terminals through the network;
a lottery terminal, one of the plurality of lottery terminals, comprising:
a special purpose processor equipped to run encryption algorithms;
a communications system electronically connected to the special purpose processor and to the lottery server through the network;
a display screen electrically connected to the special purpose processor equip to display a lottery ticket;
wherein the special purpose processor executes codes to determine a geographic area of a user from a plurality of geographic areas, uses the geographic area to determine a count of symbols for the user to select based upon the geographic area, receive from the user a selected set of symbols and display the symbols on the lottery ticket on the display screen,
wherein the count of symbols is based on a population of the geographic area.

17. The lottery system of claim 16 wherein the symbols are numbers.

18. The lottery system of claim 16 wherein the geographic area is selected by the user.

19. The lottery system of claim 16 wherein the lottery terminal further comprises a GPS chip electrically connected to the special purpose processor, said GPS chip determining the geographical area.

20. The lottery system of claim 16 wherein each geographic area has unique odds of winning and unique prizes.

* * * * *